(12) United States Patent
Dailey

(10) Patent No.: US 8,448,070 B2
(45) Date of Patent: May 21, 2013

(54) GRAPICAL USER INTERFACE METHOD AND APPARATUS FOR COMMUNICATION ASSETS AND INFORMATION IN A DISPATCH ENVIRONMENT

(75) Inventor: Timothy Eugene Dailey, Forest, VA (US)

(73) Assignee: Harris Corporation, Melbourne, FL (US)

( * ) Notice: Subject to any disclaimer, the term of this patent is extended or adjusted under 35 U.S.C. 154(b) by 896 days.

(21) Appl. No.: 12/504,329

(22) Filed: Jul. 16, 2009

(65) Prior Publication Data

US 2011/0016402 A1 Jan. 20, 2011

(51) Int. Cl.
*G06F 3/00* (2006.01)
*G06F 3/01* (2006.01)

(52) U.S. Cl.
USPC ........... 715/738; 715/734; 715/736; 715/739; 715/742

(58) Field of Classification Search
USPC ................. 715/733, 734, 735, 736, 738, 739, 715/742
See application file for complete search history.

(56) References Cited

U.S. PATENT DOCUMENTS

| | | | |
|---|---|---|---|
| 4,926,495 A | 5/1990 | Comroe et al. | |
| 5,423,061 A | 6/1995 | Fumarolo et al. | |
| 5,649,132 A | 7/1997 | Fumarolo et al. | |
| 5,754,960 A * | 5/1998 | Downs et al. | 455/508 |
| 5,999,820 A * | 12/1999 | Sutanto et al. | 455/508 |
| 6,184,882 B1 | 2/2001 | Coley et al. | |
| 6,204,844 B1 * | 3/2001 | Fumarolo et al. | 715/736 |
| 6,477,387 B1 | 11/2002 | Jackson et al. | |
| 7,035,658 B2 | 4/2006 | Drozt et al. | |
| 7,436,937 B2 | 10/2008 | Clawson | |
| 7,633,914 B2 | 12/2009 | Shaffer et al. | |
| 7,978,826 B2 | 7/2011 | Salafia et al. | |
| 2005/0034075 A1 * | 2/2005 | Riegelman et al. | 715/714 |
| 2005/0037794 A1 | 2/2005 | Namm et al. | |
| 2006/0236328 A1 * | 10/2006 | DeWitt | 719/329 |
| 2008/0310600 A1 * | 12/2008 | Clawson | 379/45 |
| 2009/0100165 A1 * | 4/2009 | Wesley et al. | 709/223 |
| 2010/0199188 A1 * | 8/2010 | Abu-Hakima et al. | 715/733 |
| 2010/0227583 A1 * | 9/2010 | Roy et al. | 455/404.1 |
| 2011/0126111 A1 * | 5/2011 | Gill et al. | 715/736 |
| 2012/0144305 A1 * | 6/2012 | Bekiares et al. | 715/733 |

OTHER PUBLICATIONS

Information about Related Patents and Patent Applications, see section 6 of the accompanying Information Disclosure Statement Letter, which concerns Related Patents and Patent Applications. Apr. 3, 2012.

* cited by examiner

*Primary Examiner* — Nicholas Augustine
(74) *Attorney, Agent, or Firm* — Fox Rothschild, LLP; Robert J. Sacco

(57) ABSTRACT

The invention pertains to methods and apparatus for displaying information and presenting user interface controls for interfacing with a communication network and controlling communication assets on the network. The invention is particularly suited to a dispatch environment and specifically to providing an interface that permits a dispatcher to efficiently organize assets and information around individual incidents.

31 Claims, 3 Drawing Sheets

GRAPICAL USER INTERFACE METHOD AND APPARATUS FOR COMMUNICATION ASSETS AND INFORMATION IN A DISPATCH ENVIRONMENT

FIELD OF TECHNOLOGY

The invention pertains to user interfaces for displaying information in connection with communication systems. More particularly, the invention pertains to user interfaces for dispatchers on public safety and similar types of communication networks.

BACKGROUND

Communication systems, including radio communication systems, can be quite complex. Such communication systems may include numerous communication channels with many receivers, transmitters, and transceivers all operating simultaneously on the communication network. In certain types of communication networks, certain individuals, hereinafter operators, are responsible for monitoring and controlling communications and communicating with field personnel via the communication network to coordinate the efforts and locations of the field personnel.

A classic example of such an operator is a dispatcher on a public safety radio telecommunication network used by public safety officials, such as police, fire fighters, emergency medical technicians (EMTs), hospitals, etc. Other examples include military dispatchers overseeing combat operations and civilian dispatchers for transportation companies such as trucking companies, taxi and other livery companies, shipping and courier companies such as Federal Express and the United States Postal Service, and utility companies such as telephone, cable television, electricity, and gas companies. These dispatchers are often responsible for coordinating the efforts of a large number of field personnel, such as police officers, fire fighters, taxi drivers, repair and installation crews, etc.

It is common for multiple dispatchers to simultaneously operate on a single communication network, each dispatcher assuming responsibility with respect to one or more different talk groups and/or one or more different emergent incidents. The term emergent incident as used herein essentially refers to any incident having a relatively short temporal duration as compared to the useful life of the communication network and arising after the network is in operation.

A talk group, as used herein, is a set of individuals (or, more accurately, their radio devices) that can communicate with each other. For instance, police officers may comprise one talk group while fire fighters comprise a different talk group. Generally speaking, the police officers can communicate with the dispatchers and with each other using one set of communication channels and the firefighters can communicate with each other and the dispatchers using another set of channels, but the firefighters and the police officers in different talk groups normally cannot communicate with each other directly over the communication network. A talk group may be an individual police unit (e.g., SWAT, Narcotics, Canine), an individual police department, an individual EMT group, the members of an individual fire station, or combinations thereof (e.g., the New York City Fire Department and the New York City Police Department combined may be a talk group, while the New York City Police Department and the New York City Fire Department also are two other talk groups).

In large communication networks, multiple dispatchers may work side by side in a control room and have overlapping duties and responsibilities. Any single dispatcher may oversee a very large number of different talk groups, possibly numbering in the hundreds.

Commonly, a dispatcher sits at a dispatch station, which may be in a control room shared with other dispatchers. Each dispatcher station typically comprises a plurality of computer monitors and other user interface devices (such as computer mouses, foot switches, speakers, microphones, etc.). Dispatchers frequently work under emergency conditions in which potentially life and death decisions must be made under severe time constraints.

A typical dispatcher station may have about three to six computer monitors between which the dispatcher must divide his or her attention. In the exemplary dispatcher station illustrated in FIG. 1, the dispatcher 10 has four monitors 11, 12, 13, 14, three of which (12, 13, 14) are under the control of and used by a computer aided dispatch (CAD) computer system 15 that displays important information to the dispatcher, such as the locations and identities of various field personnel and equipment and the location and identity of various situations or incidents that require the attention of the field personnel. Typically, another monitor 11 is dedicated for use by a dispatch console 16. A dispatch console essentially is a specially programmed computer 16 (it may be a general purpose computer running special dispatch console software or a mission-specific computer) that manages the communication assets at the dispatcher's disposal and displays information about the communication network on a monitor like monitor 11 that is dedicated to the dispatch console. Each dispatch station further typically has a plurality of speakers 17, 18 on which the communications of the various talk groups are heard. Each speaker typically outputs the communications of a plurality of talk groups. The dispatcher normally also has a two-way communication headset 18 on which the dispatcher usually communicates with one particular talk group at any given time (or possibly a patch or simulselect group as will be discussed further below).

By way of a typical scenario using a public safety dispatcher as an example, a call taker at a 911 center receives calls from the general population relating to emergencies or other public safety situations and types up an incident report with the critical information about the emergency, such as the nature and the location of the emergency, and sends it electronically to a dispatcher's CAD system (although, in some cases, the dispatcher may also be the caller taker and the writer of the incident report.) The dispatcher reviews the information and makes a determination based on his or her experience as to what field assets (personnel, equipment, etc.) should be assigned to the incident as a function of the size and nature of the incident, the available assets and their locations, other on-going incidents, and then uses the dispatch console to create, manipulate, and control talk groups and communicate with field personnel to attempt to address the incident.

However, many CAD systems automatically generate a recommendation for the dispatcher as to what resources should be committed to an incident that was input to the system based on the information contained in the electronic incident report. For instance, the CAD system may receive an incident report of a car fire on River Road, Springfield at city grid location 24-59 and recommend that the dispatcher commit to the incident (1) a police car that is in the vicinity of the car fire (and the two corresponding police officers), (2) a hook and ladder unit from the nearest fire station, (3) an EMT unit from the same fire station, and (4) a city tow truck out of the city car lot near River Road. The dispatcher normally has the option to accept the recommendation or ignore the recommendation and choose resources of his or her own choosing.

A typical dispatch console software product, such as the Maestro$^{IP}$ system sold by the Harris Corporation, provides a database of hundreds upon hundreds of features of which a subset thereof usually is selected by the purchaser of the system for creating a suitable overall user interface for that purchaser's specific application.

Normally, a dispatcher's attention is primarily directed to the CAD system monitors 12, 13, 14, and not to the dispatch console monitor 11, which often is positioned off to the side of the CAD monitors. Nevertheless, the dispatch console has an extremely critical role in enabling the dispatcher to perform his or her duties.

SUMMARY

The invention pertains to methods and apparatus for displaying information and presenting user interface controls for interfacing with a communication network and controlling communication assets on the network. The invention is particularly suited to a dispatch environment and specifically to providing an interface that permits a dispatcher to efficiently organize assets and information around individual incidents.

In accordance with one aspect of the invention, an incident window custom configured responsive to an incident and the communication assets relevant to that incident is generated for use by the dispatcher. The incident window may be generated automatically by the dispatch console based on information about the incident that can be obtained from the CAD system in conjunction with which the dispatch console software is working. Alternatively or additionally, the dispatch console system may provide the dispatcher with an incident window template that the dispatcher can populate with UI controls and/or text boxes and other informational display modules as the dispatcher sees fit for any particular incident. In yet other embodiments, the system may generate a partially populated incident window, which the dispatcher can further customize on his own.

DETAILED DESCRIPTION OF EMBODIMENTS

Figure 1:
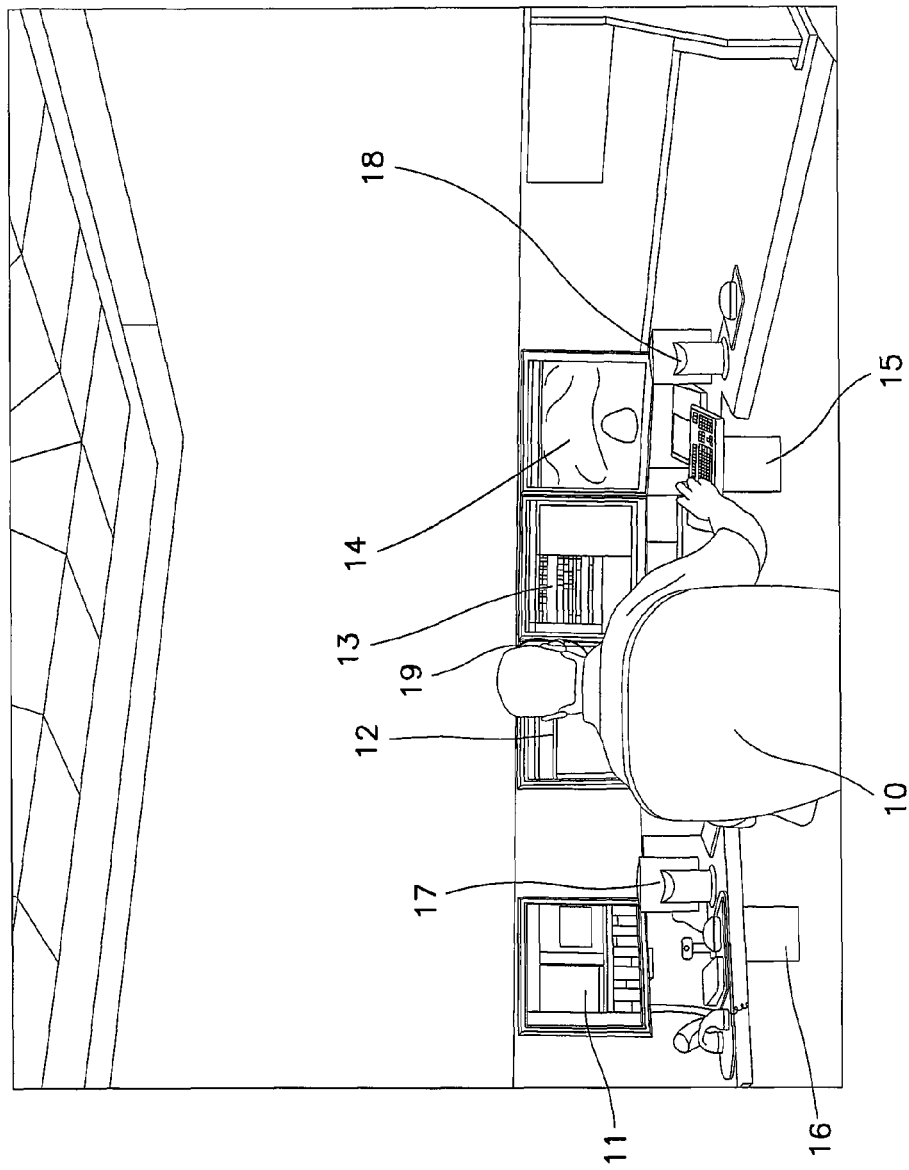
FIG. 1 illustrates a typical dispatch station.
Figure 2:
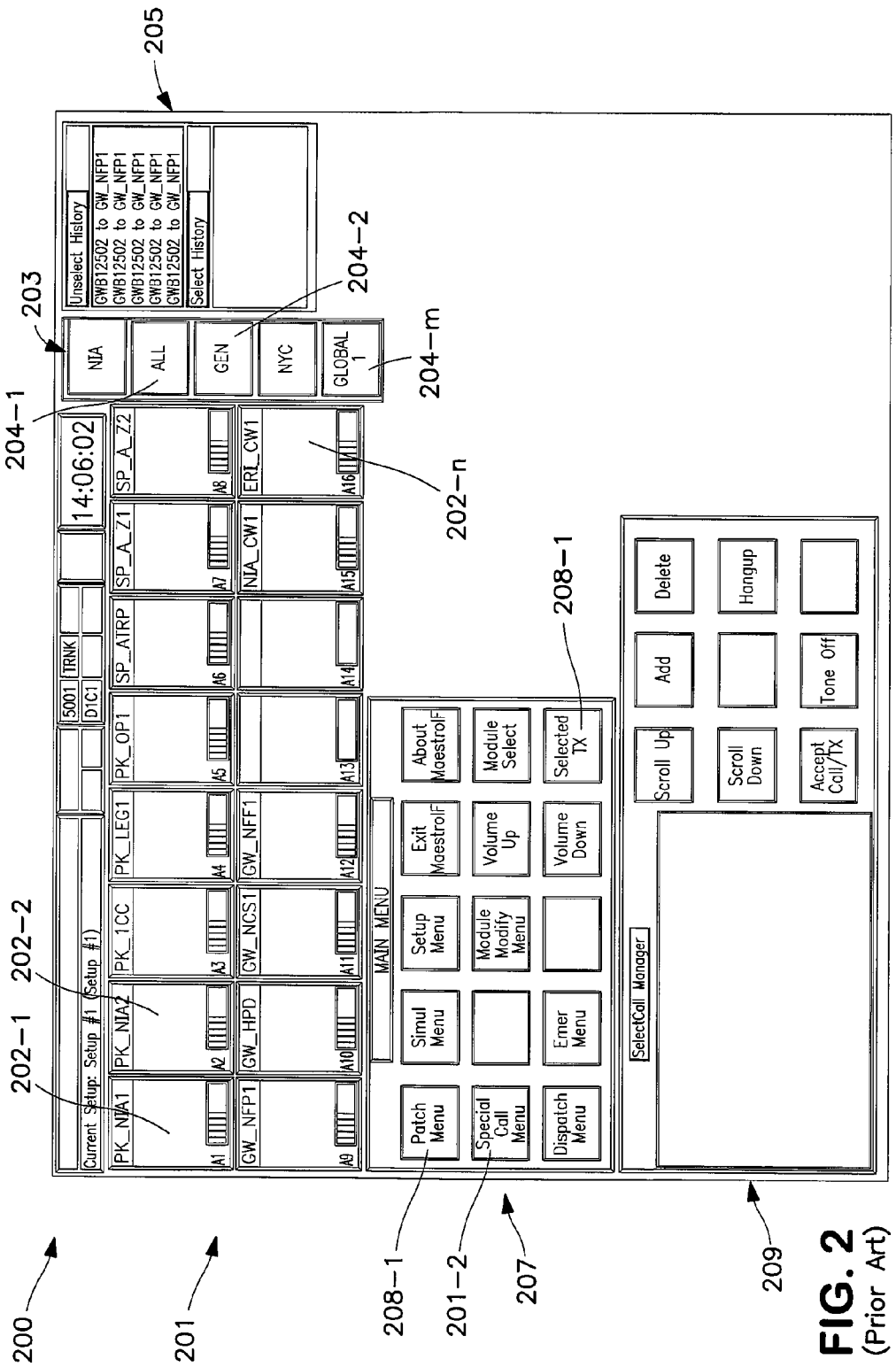
FIG. 2 illustrates a conventional dispatch console graphical user interface.

FIG. 2 illustrates a graphical user interface 200 for a dispatch console in which the interface 200 is designed for use on a full monitor dedicated to the dispatch console. FIG. 2 is merely exemplary of one particular dispatch console graphical user interface for purposes of illustration, namely, the Maestro$^{IP}$ dispatch console software sold by the Harris Corporation. The graphical user interface for this particular software package is highly customizable, as is the case for many other dispatch consoles. Portion 201 of the display includes a plurality of rectangles 202-1, 202-2, . . . , 202-n, each rectangle corresponding to a specific talk group. Typically, each rectangle will display some information about the corresponding talk group and a plurality of buttons or other UI controls that the user can manipulate to effect some operation with respect to the communication network.

In this specification, every portion of a display that has an operation that can be performed by activating it (e.g., touching it (if a touch screen), clicking a button on a mouse while a cursor is positioned over that display portion, mouse-over, or any of the many other conventional types of user input operations) may be referred to in this specification as a button, UI (User Interface) control, or widget. It should be understood that these terms are being used broadly and in an exemplary manner and are intended to encompass any reasonable user operable graphical interface element, such as radio buttons, toggle buttons, push buttons, checkboxes, sliders, list boxes, dialog boxes, pop up menus, etc. Furthermore, the act of operating such a UI control may be referred to herein by any of pressing, clicking, operating, activating, or as a UI control input. It should be understood that these terms also are being used broadly and in an exemplary manner and are intended to encompass any method of user input.

In any event, since there can be hundreds of different talk groups, they commonly might be arranged for display on a plurality of pages. Section 203 of the display shows the various pages of talk groups that can be brought up in portion 201 by pressing one of the page buttons 204-1, 204-2, . . . , 204-m in section 203. As used herein, phrases such as "pressing" or "activating" or "operating" are used in the conventional sense in the art of graphical user interfaces and include such actions as actually touching the monitor screen (in the case of touch-sensitive display), moving a cursor over a display button using a computer mouse and operating (e.g., clicking or double clicking a particular mouse button) one of the buttons on the mouse, stepping on a foot switch, etc.

A third portion of the screen 205 displays a call history, which may include a list of all calls to the dispatcher in chronological order. Each entry in the list may include information such as the time of the call, an alphanumeric ID of the caller, and the talk group to which the caller belongs. A fourth portion 207 of the screen comprises a plurality of buttons 208-1, 208-2, . . . , 208-l that may be operated to cause something to happen with respect to a one of the talk groups that has previously been selected in portion 201 (such as by left clicking on it). Some of the buttons may open up menus containing additional information and/or buttons. The particular operation or additional information to which each button corresponds will depend, of course, on the particular system and the primary focus of its intended users, but may include things such as volume up, volume down, transmit (i.e., push to talk), etc. Finally, in this example, a fifth portion of the screen 209 is dedicated to an interface for handling individual calls from radios and persons outside of the normal framework of the pre-designated talk groups. For instance, some dispatch consoles also support individual calls to specific radios outside of the talk group framework. Portion 209 may include further buttons, lists, and information that affect communication with respect to such individual calls.

Let us consider an exemplary emergent incident for a public safety dispatcher responsible for dispatching public safety officials, including police officers, firefighters, EMTs, environmental response teams (ERTs), and airborne medical evacuation (Medevac) teams to deal with public safety incidents, each incident will require particular field personnel and other field assets. For instance, let us consider a public safety incident involving a car crash on an interstate in the city of Springfield. Let us assume that the crash involved three cars and a gasoline truck and that the drivers of one of the cars is critically injured, another car is on fire, the wreckage from the accident is blocking traffic, and the gasoline truck is leaking gasoline. Accordingly, the dispatcher will need to dispatch to the incident several police officers to manage and control the incident, including the traffic, firefighters to put out the car fire, EMTs to deal with the individuals injured in the accident, a medical helicopter evacuation crew to transport the critically injured individual to a hospital, and an environmental cleanup crew to contain and/or stop the leaking gasoline. Hence, the dispatcher will need to communicate with field personnel in at least five different talk groups, namely, police, firefighters, EMTs, Medevac, and ERTs.

With reference to FIG. 2, normally, a dispatcher would need to access the GUI box $202_i$ of each of those five talk groups via display portion 201 of dispatch console display screen 200. Since the various talk groups commonly are arranged onto multiple pages and organized according to some reasonable ontology (e.g., all police talk groups on one page, all firefighter talk groups on another page, etc.), the dispatcher dealing with this incident would have a very difficult time switching between talk groups. Specifically, every time the dispatcher needed to talk to a different group, he or she might need to first select the correct page in display portion 203 by clicking on one of buttons $204_1$-$204_j$ (and possibly more, if the dispatcher is not certain on which page a particular talk groups GUI box would appear, then find that talk group's GUI box on that page in display portion 201, and then perform the desired operation. This requires a plurality of mouse clicks just to switch talk groups. In addition, a dispatcher may have difficulty even just remembering what field assets are assigned to a particular incident, especially when dealing with several incidents simultaneously.

Furthermore, the dispatcher probably would like to see information as to the status of each field asset (the term "field asset" includes personnel as well as equipment) and the information in the incident report (e.g., location, nature of incident, the time the incident started, elapsed time since the incident started, current time). Again, the dispatcher may have to perform several mouse clicks just to call up such information.

All or most of the desired information and UI controls are available somewhere in the myriad GUIs of the dispatch console and the CAD system, but is difficult to access because the GUIs of the dispatch console and the CAD system typically are organized according to logical groupings within the context of the totality of communication assets available on overall communication network. However, this organization can be very inefficient with respect to a particular incident with which a dispatcher must deal. Further, even if it were reasonably well organized for a particular incident, the dispatcher still must wade through GUIs that contain a great deal of irrelevant information and UI controls to access the information and UI controls of interest.

The present invention addresses this problem by generating an incident window responsive to a particular incident, which window is customized to present the information and UI controls that are most useful to a dispatcher with respect to that particular incident.

Figure 3:
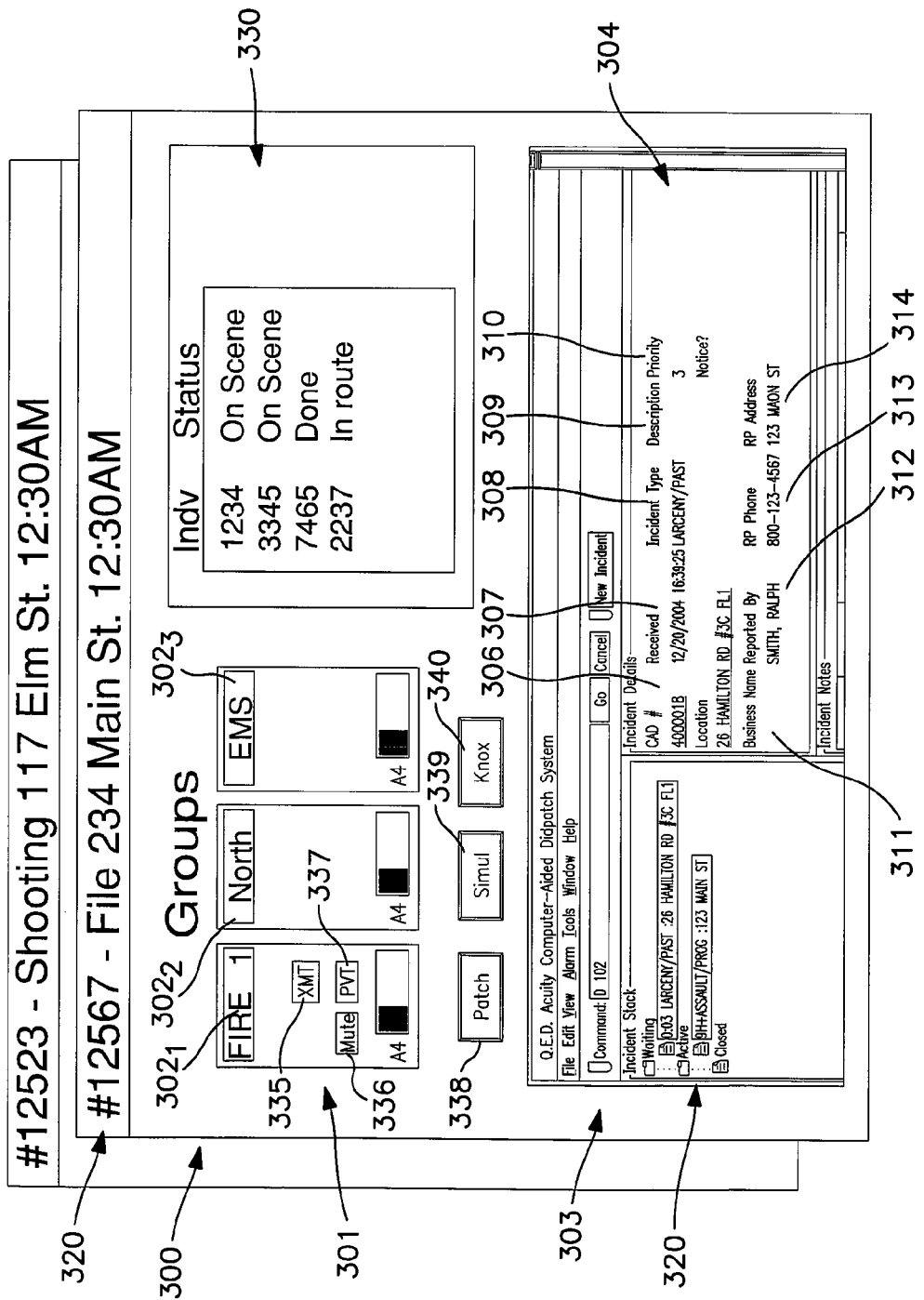
FIG. 3 illustrates an incident window in accordance with one embodiment of the invention.

FIG. 3 illustrates one such incident window 300 in accordance with the principles of the present invention that collects some of the most critical information, UI controls, and features of the dispatch console graphical user interface such as display 200 of FIG. 2 and/or a CAD system that are likely to be needed in connection with dealing with a particular incident into a single window that is well-organized and with which the dispatcher can easily perform the functions necessary to deal with the incident.

The incident window is independent of and may be used in addition to the static modules of the main dispatch console GUI 200.

Since every incident is different and likely will require different field assets, the incident window should be generated in real time after the commencement of the incident and responsive to incident-specific information. In one embodiment, the dispatch console automatically generates an incident window as a function of the information contained in the incident report that typically is generated by a 911 call taker or the like. For instance, as previously noted, many CAD systems already include software for analyzing the information contained in an incident report and generating a recommendation as to the field assets that should be assigned to the incident. Therefore, in accordance with this embodiment, a software module received the incident report and generates an incident window containing information modules and/or UI control modules as a specific function of the information in the incident report. The incident report can be transmitted to the incident window software module in any reasonable form, such as an XML document.

For instance, the incident window 300 may have a title bar 320 in which the incident ID number, location, and start time are displayed. Within the body of the incident window, if the CAD system generates a recommendation of field assets to assign to the incident, a plurality of GUI boxes, such as GUI boxes $201_1$-$201_n$ may be placed in a first portion 301 of the incident window 300. Thus, in this example, area 301 is populated with the GUI boxes $302_1$-$302_3$ of three different talk groups, namely, the relevant police talk group GUI box $302_1$ (e.g., the state trooper talk group for Springfield), the relevant firefighter talk group $302_2$ (e.g., fire station 13 for the northeast quadrant of Springfield), the EMT talk group for the eastern part of the state $302_3$, the EMT talk group for the eastern part of the state $302_4$, and the talk group for the Medevac unit associated with Springfield University Hospital $302_5$. The talk group GUIs may be identical copies of a subset of the talk group GUIs $201_1$-$201_n$ in the standard dispatch console interface 200. Alternately, they may be further customized as a function of the specific incident. The incident window software may obtain copies of these talk group GUIs from a database of UI controls, informational display modules and other GUIs available in the main dispatch console software. In this example, various different UI controls are present in each talk group GUI. For instance, by left clicking the mouse while the cursor is positioned over any one of the talk group GUIs, that talk group is transferred to the dispatcher's headset and the talk group GUI is highlighted or otherwise altered to distinguish it from the other talk group GUIs to indicate that it is the active talk group. In accordance with one embodiment, right clicking when the cursor is positioned over the highlighted talk group GUI causes the dispatcher to transmit on that talk group (it has the effect of a PTT (press-to-talk) button). Within each talk group GUI $302_1$-$302_5$, a number of UI controls may appear. Merely as examples, one or more alert buttons indicative of certain specific notable situations, may appear within the GUI box when appropriate.

For instance, the radios carried by field personnel in public safety networks often have an emergency button 335 that the field personnel can press to indicate an emergent situation. If that button has been pressed by any of the field personnel in the corresponding talk group, then an Emergency icon 335 appears in the box. Also, a PVT (private) icon 336 may appear if the communications in that talk group are encrypted. Also, a Mute icon 337 may appear when that talk group is muted. The simulated digital VU meter 338 at the bottom of each talk group GUI shows the current relative volume of the talk group.

Also, patch and simulselect buttons 338 and 339 may be provided in another section of the incident window to allow the dispatcher to easily create a patch or simulselect group of all of the talk groups assigned to that incident with a single mouse click.

A patch is a temporary conjunction of two or more talk groups that are not normally permitted to communicate with each other directly through the communication network. Activating a patch group allows the dispatcher to communicate with all members of all of the talk groups in the patch group and also allows the individual members of those talk groups to communicate with each other directly. For instance, one talk group may be the city of Springfield police department and another talk group may be the Springfield fire department. Members of these two talk groups normally cannot communicate with each other over the communication network. However, in certain emergency situations, e.g., a car accident involving a flammable liquid on fire, it may be necessary to allow radios in these two talk groups to communicate with each other directly via the communication network. A simulselect group is similar to a patch group in the sense that it is a conjoining of two or more talk groups that allows the dispatcher to speak with members of all of the groups in the simulselect group, but the individuals in the various separate talk groups remain unable to speak with each other. Of course, individuals in each talk group comprising the simulselect group still can speak with the other individuals in their same talk group.

In accordance with yet another feature, a button 340 may be provided for opening a Knox box relevant to a particular incident. A Knox box is a box often found on outside walls of building that contains the keys to the building to allow public safety officials responding to an emergency to gain access to the building. They are locked boxes containing a microphone and electronic circuitry configured to unlock the box when a certain audio sequence in detected by the microphone. The audio sequence may be a plurality of different tomes played in the correct order for the correct time period. A public safety official who needs to access the building typically will walk up to the relevant know box, call a dispatcher using his radio and ask the dispatcher to play the tone sequence for that Knox box. The official then holds the radio up to the box and the dispatcher operates the dispatch console to cause the sequence to be transmitted to the official's radio and played over the speaker of the radio. Button 340 gives the dispatcher one-touch access to open the know box. That is, activating the button 340 causes the tone sequence for the relevant Knox box to be transmitted to the officials radio.

In addition, the exemplary incident window 300 includes an incident report section 303 that shows all or some of the information from the incident report. Again, the incident report portion 303 may be a copy of the incident report as it is generated and normally shown in one of the display screens of the CAD system. In this example, the right-hand portion 304 of the incident report section 303 shows relevant information such as the number that the CAD system assigned to the incident 306, the time that the incident was reported 307, the type of the incident (a completed larceny in this example) 308, any descriptive information available (in this case none is shown) 309, the incident priority 310, the business from which the call was placed (in this case, none) 311, the name of the person who called in the incident 312, the telephone number from which the call was placed 313, and the address from which the incident was called in 314.

The left-hand side of incident report portion 303 shows a list of all pending incidents for easy reference. Particularly, any given dispatcher may be dealing with multiple incidents simultaneously and, therefore, it would be useful to have a reminder of what incidents are pending and possibly some status information. In this particular example, the list is segmented into incidents that have not yet been addressed by a dispatcher (the "pending" section) and incidents that a dispatcher has addressed) the "active" section). In one embodiment, left clicking the mouse when the cursor is positioned over the text corresponding to one of the incidents listed in portion 320 causes the corresponding incident window to come to the front of the display screen.

The incident window may be populated with any subset of UI controls, informational display modules, and other GUIs available in the dispatch console.

In other embodiments, the incident window may also show a map of the area within which the incident occurred, including the locations of the incident and various communication assets responding to the incident. This can be obtained directly from the CAD system, which has such maps and information.

Another portion 330 of the incident window 300 displays the status of each field asset with respect to the incident. The dispatch console software may update the status of communication assets in the incident window. The dispatch console may be configured to do this automatically at predetermined intervals or responsive to any change in the status of a communication asset in the incident window.

Incident window 300 is merely exemplary. The incident window may have a different format and different portions and types of The software module of the present invention may be part of the dispatch console software package, part of the CAD system software package, or an independent software package that interfaces with one or both of the dispatch console software and CAD system software. In the latter embodiments, the interfaces can be through one or more Application Program Interfaces (APIs) or similar well-known means for allowing different software programs to exchange data with each other. In other embodiments, the software may be embodied as a plug-in module to one of the dispatch console software and CAD system software.

The incident window may further operate in accordance with standard GUI conventions, such as having the minimize, maximize, and close buttons usually found in the title bar of windows of programs operating on the Microsoft™ Windows™ operating system. Also, it may be repositioned by clicking in the title bar and dragging or may be resized by clicking on any edge or corner of the window and dragging.

In some embodiments, the incident window may be manually populated with information modules and UI controls by the dispatcher. In such embodiments, the incident window software may automatically generate a template for each new incident report. The software may permit the dispatcher to populate the template in any reasonable way. For instance, the template may comprise nothing but a substantially blank window superimposed over the display 200 of the dispatch console. The substantially blank window may have an Edit button and a Delete button. When the Edit button is activated, the dispatcher may be enabled to populate the blank incident window by dragging and dropping information modules and UI controls from the dispatch console display 200 into the incident window. If the dispatcher does not feel the need for the incident window, he may delete it by activating the Delete button.

In some embodiments, the incident window may be automatically pre-populated by the system, such as illustrated in FIG. 3, but the dispatcher is enabled to customize the pre-populated window by adding, deleting, or moving the various information modules and UI controls, when an edit mode is activated.

Even further, a plurality of semi or fully populated templates can be stored in memory for use by the system or the dispatchers, each template specifically designed for certain types of incidents. For instance, most fires probably require relatively similar sets of communication assets, UI controls, and/or informational display modules, while most traffic accidents may require a different set of typical communication assets, UI controls and/or informational modules.

A key feature of the incident window is that UI controls and information modules are organized as a function of the communication assets used in connection with specific incidents, rather than the overall communication assets available on the communication network. The incident window presents the various information and UI controls in one simple window and in an uncluttered fashion without any unnecessary information or UI controls.

In accordance with another feature, incident windows may be transferred between dispatch stations. Particularly, sometimes one dispatcher becomes overloaded and must pass on an incident that he has begun handling onto a different dispatcher. In accordance with this feature of the system, an incident window such as incident window 300 can be transferred to another dispatch station. The transfer can be performed over the communication network in any reasonable fashion. For instance a message can be generated that transmits an XML document over the network containing an information set comprising all of the information needed to build an identical incident window on another computer, such as the identities of all of the informational display modules and UI controls and their layout within the window.

As illustrated in FIG. 3, a dispatcher may have multiple incident windows open on his display. In accordance with one embodiment and consistent with the standard Microsoft Windows operating system fashion, the dispatcher may activate any particular incident window by clicking anywhere within that window. This will cause that window to jump to the top viewing layer and activate the window for further operations. Also, as in standard Microsoft Windows operation fashion, all other windows may become inactive. In accordance with yet another possible feature of the incident window, when a dispatcher activates an incident window as described immediately above, the dispatch console automatically switches one or more other pieces of the dispatcher's equipment accordingly. For instance, the dispatcher's headset, PTT button, and/or footswitch may be switched to the last talk group (or patch or simulselect group) accessed in that incident window (or to a default talk group in that incident window).

When the incident is completed, the dispatcher can close the incident window (in any reasonable fashion, such as by clicking a close button in the title bar of the incident window or a Delete button within the body of the incident window). Responsive to the closing of the incident window, the incident window software releases all of the communication assets in the window.

A copy of the data defining the incident window may be saved in memory so that the window can be recalled either for reactivation (e.g., in case it was prematurely closed or if a similar incident occurs at a later time) or for research or recordkeeping purposes. In fact, in some embodiments, it may be a useful feature to log all activities occurring in connection with an incident window with an incident tag and timestamp tag so that the incident can be reviewed at a later time such as for training or evaluation purposes.

As is common with respect to some of the UI controls in the conventional static dispatch console displays such as display 200, some UI control inputs may cause additional windows, frames, dialog boxes, pop-up menus, and the like to appear. For instance, right clicking on the Emergency button may bring up a pop-up window that shows relevant information about the emergency, such as the identity of the field officer declaring the emergency, his or her talk group 512, and the time at which the emergency was declared.

While the invention has been described in connection with an emergency situation in a public safety radio network, this si merely exemplary. The invention is applicable to any communication system in which it may be useful to generate a specific user interface for a person that needs to interface with the system responsive to a particular temporal incident.

The invention has been described hereinabove as a software module or package. The software may be delivered to a user or customer on a computer readable medium from which it can be loaded onto a computer or other digital processing device into executable form for use. Alternately, it may be delivered in executable form and already embodied within a computing device. In addition, it should be understood that software is merely an example of an embodiment of the invention and that any or all of the above discussed features, steps, and processes may be implemented with software, firmware, hardware or combinations thereof. This includes, but is not limited to, computers, microprocessors, processors, digital signal processors, state machines, integrated circuits, FPGAs (Field Programmable Gate Arrays), combinational logic, analog circuits, digital circuits, program software, and any combinations thereof.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. An apparatus for generating a graphical user interface for permitting a user to interface with a communication network comprising:
   a computing device configured to:
      provide a first graphical user interface within a display window comprising static elements including a plurality of User Interface (UI) controls and informational display modules, the UI controls facilitating the interface with and control of the communication network, and the informational display modules facilitating the display of information useful for coordinating efforts of field personnel;
      receive an incident report that was input into the communication network after commencement of a temporal incident concerning at least one of a physical object, a person and a geographic location;
      dynamically select, in real-time, a subset of the UI controls and the informational display modules that are useful for activating services necessary to respond to the temporal incident described in the incident report, which temporal incident the user is intended to address via communications on the communication network;
      dynamically generate a second graphical user interface including the subset of UI controls and the informational display modules which were previously dynamically selected based on the contents of the incident report, said second graphical user interface being separate and distinct from said first graphical user interface; and
      display the second graphical user interface while the first graphical user interface is being displayed in the display window;

wherein the first graphical user interface and the second graphical user interface are provided by different software packages.

2. The apparatus of claim 1, wherein the temporal incident is a public safety incident, the communication network is a public safety network, and the display window is configured to assist a dispatcher in communicating with communication assets to address the temporal incident.

3. The apparatus of claim 2, wherein the UI controls interface with a dispatch console for controlling communications on the communication network.

4. The apparatus of claim 3, wherein said first graphical user interface is generated by computer aided dispatch (CAD) software.

5. The apparatus of claim 4, wherein the UI controls and informational display modules are selected as a function of a recommendation of communication assets to be assigned to the temporal incident generated by the CAD system.

6. The apparatus of claim 1, wherein the UI controls and informational display modules are selected as a function of communication assets assigned to the temporal incident.

7. The apparatus of claim 1, wherein the UI controls and informational display modules are selected based at least in part on data obtained from Computer Aided Dispatch (CAD) software.

8. The apparatus of claim 7, wherein the data obtained from the CAD software comprises a recommendation of communication assets to be assigned to the temporal incident generated by the CAD software.

9. The apparatus of claim 1, wherein the UI controls and informational displays are at least partially configured by a user.

10. The apparatus of claim 1, wherein the UI controls and informational display modules comprise at least a plurality of talk group boxes, each displaying information about a corresponding talk group and containing at least one UI control for controlling communications on the communication network for the corresponding talk group.

11. The apparatus of claim 10, wherein a status box is displayed in the display window indicating the status of each field asset assigned to the temporal incident.

12. The apparatus of claim 1, wherein the UI controls and informational display modules are selected as a function of an electronic incident report.

13. A computer readable product embodied on computer readable media readable by a computing device for permitting a user to interface with a communication system, the product comprising computer executable instructions operative for:
   interfacing with a Computer Aided Dispatch (CAD) system to receive information about a temporal incident described in an incident report and a first graphical user interface window provided thereby, said first graphical user interface window comprising static elements including a plurality of User Interface (UI) controls facilitating the interface with and control of the communication system;
   dynamically selecting, in real-time, a subset of the UI controls that are useful for activating services necessary to respond to the temporal incident described in said incident report, which temporal incident a user is intended to address via communications on a communication network;
   dynamically generating a second graphical user interface window comprised of the subset of the UI controls which were previously dynamically selected based on the contents of the incident report, said second graphical user interface window being separate and distinct from said first graphical user interface window; and
   displaying the second graphical user interface window while the first graphical user interface is being displayed in the display window;
   wherein said incident report was input into said communication network after commencement of said temporal incident concerning at least one of a physical object, a person and a geographic location.

14. The computer readable product of claim 13, wherein the computer executable instructions are further operative for interfacing with the CAD system to receive the incident report.

15. The computer readable product of claim 13, wherein the computer executable instructions are further operative for:
   generating an information set defining the subset of UI controls and a layout thereof within the second graphical user interface window; and
   transmitting the information set to a computer other than the computer on which the second graphical user interface window was created.

16. The computer readable product of claim 13, wherein the computer executable instructions are further operative for selecting at least a plurality of talk group graphical user interfaces, each displaying information about a corresponding talk group and containing at least one UI control for controlling communications on the network for the corresponding talk group.

17. The computer readable product of claim 13, wherein the second graphical user interface window is configured to assist a dispatcher in communicating with field resources to address the temporal incident.

18. The computer readable product of claim 13, wherein the first graphical user interface window further comprises informational display modules including display information derived from the CAD system.

19. The computer readable product of claim 13, wherein the computer executable instructions are further operative for selecting the UI controls as a function of communication assets assigned to deal with the temporal incident.

20. The computer readable product of claim 13, wherein the computer executable instructions are further operative for:
   permitting a user-software interaction to add or delete at least one UI control to the second graphical user interface window; and
   permitting a user-software interaction-to arrange the UI controls of the subset in the second graphical user interface window.

21. The computer readable product of claim 13, wherein the computer executable instructions are further operative for interfacing with the CAD system to receive a recommendation of communication assets to be assigned to the temporal incident generated by the CAD system.

22. A computer readable product embodied on computer readable media readable by a computing device for permitting a dispatcher to control communication assets of a communication network, the product comprising computer executable instructions operative for:
   generating a first window template into which a user can place User Interface (UI) controls and informational display modules pertaining to a communication network to create a custom interface corresponding to a temporal incident described in an incident report that is input into the communication network after commencement of a temporal incident concerning at least one of a physical object, a person and a geographic location;

providing a graphical user interface displaying static elements comprising a plurality of UI controls and a plurality of informational display modules pertaining to a plurality of talk groups on the communication network, said plurality of UI controls facilitating an interface with and the control of the communication network by the dispatcher, and the informational display modules facilitating the display of information useful for coordinating efforts of field personnel;

permitting the user to select first ones of the plurality of UI controls and second ones of the plurality of informational displays from the graphical user interface that are useful for activating services necessary to respond to the temporal incident described in the incident report, which temporal incident the dispatcher is intended to address via communications on the communication network; and permitting a user to place the first and second ones which were selected in the template window;

wherein the template window is displayed while the graphical user interface is being displayed in a display window.

23. The computer readable product of claim 22, wherein the computer executable instructions are further operative for interfacing with a Computer Aided Dispatch (CAD) system to receive information about the temporal incident and to automatically partially populate the template window with UI controls and informational display modules as a function of the information received from the CAD system.

24. The computer readable product of claim 22, wherein the computer executable instructions are further operative for permitting a user-software interaction to drag and drop UI controls and informational display modules into the template window.

25. A method of generating a customized graphical user interface window for interfacing with dispatch console software that controls a communication network in connection with a temporal incident, comprising:

receiving, by incident window software executing on a computer, an incident report containing incident information about the temporal incident from the dispatch console software, the incident report having been input into the communication network after commencement of the temporal incident concerning at least one of a physical object, a person and a geographic location;

dynamically selecting, in real time, a subset of first User Interface (UI) controls of a first graphical user interface window provided by the dispatch console software that are useful for activating services necessary to response to the temporal incident described in the incident report, which temporal incident a user is intended to address via communications on the communications network;

dynamically building a second graphical user interface window comprising the subset of first UI controls which were previously dynamically selected based on the contents of the incident report, said second graphical user interface window being separate and distinct from said first graphical user interface window; and displaying the second graphical user interface window while the first graphical user interface window is being displayed in a display window.

26. The method of claim 25, wherein the temporal incident is a public safety incident and the communication network is a public safety communication network.

27. The method of claim 25, wherein the second graphical user interface window further comprises at least one informational display modules displaying information derived from the dispatch console software.

28. The method of claim 27, wherein the incident information comprises a recommendation of communication assets to be assigned to the temporal incident.

29. The method of claim 25, wherein the subset of first UI controls are selected by a user from a database of UI controls.

30. The method of claim 25, wherein the subset of first UI controls comprises a talk group box displaying information about a corresponding talk group and containing at least one UI control for controlling communications on the network for the corresponding talk group.

31. The method of claim 25, wherein the subset of first UI controls are selected as a function of an electronic incident report.

* * * * *